J. F. PENDER.
COMPENSATING BEARING.
APPLICATION FILED JULY 17, 1912.
1,093,290.
Patented Apr. 14, 1914.
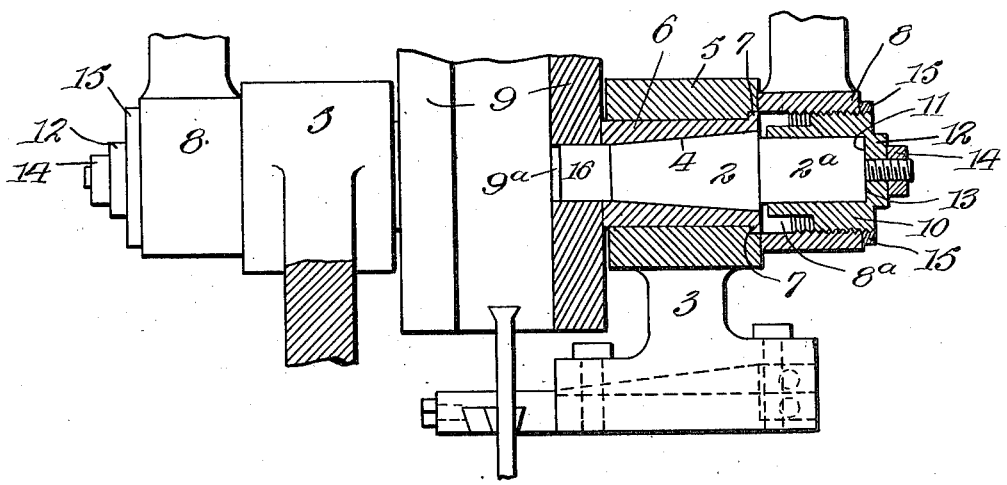
WITNESSES
INVENTOR
JOHN FRED PENDER
BY ATTORNEY

UNITED STATES PATENT OFFICE.

JOHN FRED PENDER, OF ST. JOHN, NEW BRUNSWICK, CANADA, ASSIGNOR OF ONE-HALF TO JAMES PENDER, OF ST. JOHN, NEW BRUNSWICK, CANADA.

COMPENSATING BEARING.

1,093,290.

Specification of Letters Patent. Patented Apr. 14, 1914.

Application filed July 17, 1912. Serial No. 709,945.

*To all whom it may concern:*

Be it known that I, JOHN FRED PENDER, of the city of St. John, in the Province of New Brunswick, Canada, have invented certain new and useful Improvements in Compensating Bearings; and I do hereby declare that the following is a full, clear, and exact description of the same.

This invention relates particularly to bearings used in connection with those working parts of a machine which are to be maintained in accurate position with relation to another part.

The object of the invention is to provide a new and improved bearing whereby the desired adjustment of the part or parts supported thereby may be readily secured and any subsequent variance easily and quickly rectified without removing the parts.

For full comprehension, however, of my invention reference must be had to the accompanying drawing forming a part of this specification in which similar reference characters indicate the same parts and wherein my improved bearing is illustrated in connection with a wire nail machine, shown partly in plan and partly in section.

My improved bearing consists of a pin 2 adapted to have the arm, lever or other part 3 to be supported, rotatably mounted thereon. The pin is formed with a tapered portion 4 preferably between its ends, and the bearing boss 5 of the lever 3 is formed to correspond to the taper of the pin, it being preferred to provide such boss with a bushing 6 which is interiorly tapered and has the tapered portion 4 passed therethrough. The bushing 6 is formed at one end with a flange 7 which enters an interior groove at one end of the boss 5 and bears against the shoulder formed thereby.

I prefer to support the pin at both ends within frame pieces or bearings 8 and 9 which are formed with openings 8ª and 9ª for the reception of the ends of the pin. One end of the pin or that end 2ª adjacent to the larger end of its tapered portion passes through an adjusting bushing 10 screw-threaded within the frame piece 8 and having an internal shoulder 11 and an hexagonal head 12, the extreme end of the pin being reduced to form a shoulder 13 and screw-threaded to receive a nut 14, a lock nut 15 being screwed on the outer end of the bushing 10.

When the connection between the pin 2 and its bearing (bushing 6) becomes slack due to the wearing of the parts and as a result the lever 3 cants out of position or out of proper alinement with the bearing pin, the adjusting bushing 10 is screwed by means of the head 12 into the opening 8ª and engaging the shoulder 13 of the pin with the shoulder 11 forces the pin longitudinally in the direction of its taper. As the pin is forced in the described direction, its gradually increasing diameter takes up the slackness therebetween and the bushing 6 and tightens the connection, bringing the lever into alinement with the pin.

The opposite end 16 of the pin is straight or parallel and a space is left between the tapered portion and the adjacent surface of the frame piece 9 to permit of the longitudinal adjustment of the pin, the opening 9ª being of sufficient extent to accommodate the movement of the pin. The space between the tapered portion and the frame piece 9 may be secured by distancing the boss 5 from the latter or if the boss 5 abuts against the frame piece, by terminating the taper of the bushing 6 and pin 2 a short distance from the end of the boss.

From the drawings which illustrate a portion of a wire nail machine it will be apparent that the use of my improved bearing will increase the efficiency of such machines by enabling the cutting-off levers, one of which is indicated at 3, to be adjusted so that the cutter bars carried thereby are maintained in perfect alinement by adjusting the bearings to take up the wear to which they are exposed. Furthermore, the application of the bearing to a wire nail machine is readily accomplished as the guide for the header bar (not shown) may be utilized as one of the supporting frame pieces for the pin 2, as indicated at 9.

What I claim is as follows:

1. A compensating bearing including a bearing portion having an opening therein, a portion of which is screw-threaded, a bearing pin having one of its ends located in said opening and presenting a tapered portion to form a bearing and a bushing exteriorly screw-threaded to take into said screw-threaded opening and engage with the pin to move it longitudinally.

2. In a wire nail machine, the combination of a fixed frame portion having an opening therethrough, a portion of which is screw-threaded; a second frame portion having an opening therethrough; a bearing pin having its ends located in said openings and presenting a tapered portion located between the frame portions to form a bearing for a lever, and a bushing screw-threaded exteriorly to take into said screw-threaded opening and engage with the pin to move it longitudinally.

3. In a wire nail machine, the combination of a fixed frame portion having an opening therethrough partly screw-threaded; a second frame portion having an unthreaded opening therethrough; a bushing screw-threaded exteriorly to take into the screw-threaded opening, having an internal shoulder formed thereon and a diminished opening at one end thereof; a bearing pin having its ends located in said openings, formed with a shoulder to bear against the shoulder of the bushing and a screw-threaded reduced end projecting through the diminished opening in said bushing, such pin presenting a tapered portion located between the frame pieces to form a bearing for a lever; a lock nut screwed upon the bushing and a nut upon the screw-threaded reduced end of the pin.

In testimony whereof, I have signed my name to this specification, in the presence of two subscribing witnesses.

JOHN FRED PENDER.

Witnesses:
H. RUSSELL STURDLE,
LEWIS C. THOMPSON.

---

Copies of this patent may be obtained for five cents each, by addressing the "Commissioner of Patents, Washington, D. C."